United States Patent
Sato et al.

(10) Patent No.: US 9,199,525 B2
(45) Date of Patent: Dec. 1, 2015

(54) VEHICLE DOOR FRAME AND INNER MEMBER FOR VEHICLE DOOR FRAME

(71) Applicants: AISIN SEIKI KABUSHIKI KAISHA, Kariya-shi (JP); HISADA CO., LTD., Anjo-shi (JP)

(72) Inventors: Eisuke Sato, Nagoya (JP); Masashi Saeki, Toyota (JP)

(73) Assignees: AISIN SEIKI KABUSHIKI KAISHA, Kariya-Shi, Aichi-Ken (JP); HISADA CO., LTD., Anjo-Shi, Aichi-Ken (JP)

( * ) Notice: Subject to any disclaimer, the term of this patent is extended or adjusted under 35 U.S.C. 154(b) by 0 days.

(21) Appl. No.: 14/363,073

(22) PCT Filed: Nov. 30, 2012

(86) PCT No.: PCT/JP2012/081024
§ 371 (c)(1),
(2) Date: Jun. 5, 2014

(87) PCT Pub. No.: WO2013/084801
PCT Pub. Date: Jun. 13, 2013

(65) Prior Publication Data
US 2014/0339853 A1 Nov. 20, 2014

(30) Foreign Application Priority Data
Dec. 9, 2011 (JP) .................................. 2011-270414

(51) Int. Cl.
*B60J 5/04* (2006.01)
*B23K 33/00* (2006.01)
(Continued)

(52) U.S. Cl.
CPC ............. *B60J 5/0402* (2013.01); *B23K 11/115* (2013.01); *B23K 11/14* (2013.01); *B23K 33/008* (2013.01); *B23K 2201/006* (2013.01); *B23K 2201/18* (2013.01); *B23K 2203/04* (2013.01)

(58) Field of Classification Search
CPC ..... B60J 5/0402; B23K 33/008; B23K 11/14; B23K 11/115
USPC ................... 49/502; 296/146.1, 146.5, 146.9, 296/146.15
See application file for complete search history.

(56) References Cited

U.S. PATENT DOCUMENTS 4,650,274 A * 3/1987 Schmid .......................... 439/801
6,054,668 A * 4/2000 Van Otteren et al. ........... 219/93
(Continued)

FOREIGN PATENT DOCUMENTS

| CN | 1275953 A | 12/2000 |
|---|---|---|
| JP | 11-033737 A | 2/1999 |

(Continued)

OTHER PUBLICATIONS

International Search Report (PCT/ISA/210) mailed on Jan. 15, 2013, by the Japanese Patent Office as the International Searching Authority for International Application No. PCT/JP2012/081024.
(Continued)

*Primary Examiner* — Jerry Redman
(74) *Attorney, Agent, or Firm* — Buchanan Ingersoll & Rooney PC (57) ABSTRACT

A vehicle door frame includes an outer member and an elongated inner member. The inner member includes an extended portion, which extends in an outward direction of the vehicle, and an edge portion, which includes a distal end surface. A protrusion is formed on the distal end surface. The protrusion protrudes in the outward direction of the vehicle and is located at a predetermined position of the inner member in the longitudinal direction. The folded portion has a facing portion that faces the distal end surface. The protrusion can be melted by heating by the concentration of electric current during resistance welding and is configured to pressurize and join the distal end surface and the facing portion of the folded portion to each other. The protrusion includes a tip end, which has an arcuate cross section protruding in the outward direction of the vehicle.

5 Claims, 5 Drawing Sheets (51) Int. Cl.
*B23K 11/11* (2006.01)
*B23K 11/14* (2006.01)

(56) References Cited

U.S. PATENT DOCUMENTS

| | | | |
|---|---|---|---|
| 6,092,865 | A | 7/2000 | Jaekel et al. |
| 6,282,790 | B1 | 9/2001 | Jaekel et al. |
| 6,302,478 | B1 | 10/2001 | Jaekel et al. |
| 6,346,684 | B1 | 2/2002 | Gabbianelli et al. |
| 6,533,348 | B1 | 3/2003 | Jaekel et al. |
| 2001/0000119 | A1 | 4/2001 | Jaekel et al. |
| 2001/0002760 | A1 | 6/2001 | Gabbianelli et al. |
| 2001/0019039 | A1 | 9/2001 | Gabbianelli et al. |
| 2001/0050497 | A1 | 12/2001 | Jaekel et al. |
| 2002/0100746 | A1 | 8/2002 | Gabbianelli et al. |
| 2002/0100747 | A1 | 8/2002 | Gabbianelli et al. |
| 2002/0104830 | A1 | 8/2002 | Gabbianelli et al. |
| 2002/0149189 | A1 | 10/2002 | Barber et al. |
| 2012/0058390 | A1* | 3/2012 | Obayashi et al. ............. 429/179 |
| 2014/0312656 | A1* | 10/2014 | Gim et al. .................... 296/210 |

FOREIGN PATENT DOCUMENTS

| | | |
|---|---|---|
| JP | 2002-239738 A | 8/2002 |
| JP | 2005-259920 A | 9/2005 |
| JP | 2011-68181 A | 4/2011 |

OTHER PUBLICATIONS

English Version of International Preliminary Report on Patentability (Form (PCT/IB/373) issued Jun. 10, 2014, by the International Bureau of WIPO in corresponding International Application No. PCT/JP2012/081024. (5 pages).

Office Action issued on Feb. 10, 2015, by the Japan Patent Office in corresponding Japanese Patent Application No. 2011-270414, and a Partial English translation of the Office Action.(3 pages).

Journal of Technical Disclosure No. 2006-501196, Japan Institute of Invention and Innovation, 2006 (month unknown). (3 pages).

Office Action issued by the Chinese Patent Office on Jul. 31, 2015 in corresponding Chinese Application No. 201280058806.5, and English language translation of Office Action (11 pages).

\* cited by examiner

VEHICLE DOOR FRAME AND INNER MEMBER FOR VEHICLE DOOR FRAME

FIELD OF THE INVENTION

The present invention relates to a vehicle door frame forming a window frame of a vehicle door and an inner member for the vehicle door frame.

BACKGROUND OF THE INVENTION

This kind of vehicle door frame includes a post and a substantially arcuate upper rim. The post is fixed to a door body in the rear portion in the longitudinal direction of the vehicle and extends in the height direction of the vehicle. The upper rim is fixed to the door body in the front portion in the longitudinal direction of the vehicle and connected to the upper end of the post. The post includes an outer member and an inner member each formed by press molding a plate made of a steel plate, for example. One edge portion of the outer member is curled such that one edge portion of the inner member is located in the curled edge portion. The other edge portion of the outer member and the other edge portion of the inner member are coupled with each other by welding. This integrates the members. For example, refer to Patent Document 1.

Figure 8A:
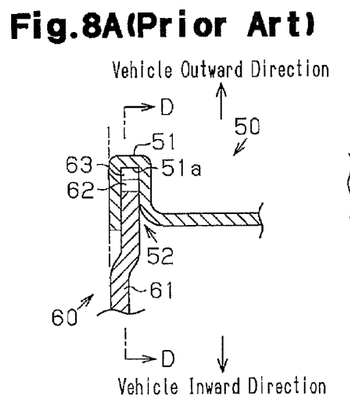
FIG. 8A is a cross-sectional view of the joint forms of the outer member and the inner member in the conventional door frame, illustrating the surroundings of the folded portion in the temporarily coupled state prior to the joint.
Figure 8B:
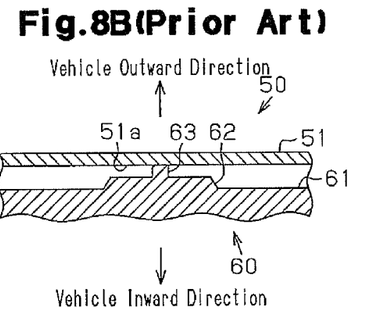
FIG. 8B is a cross-sectional view taken along line D-D.

For example, as shown in FIGS. 8A and 8B, a folded portion 51, which is folded in the outward direction of the vehicle and further folded in the inward direction of the vehicle, is formed on the edge portion of the outer member 50 for welding. The folded portion 51 includes an opening 52, which opens in the inward direction of the vehicle. An extended portion 61, which extends in the outward direction of the vehicle, is formed on the edge portion of the inner member 60 for welding. The inner member 60 is temporarily coupled to the outer member 50 such that the edge portion of the extended portion 61 is inserted into the opening 52 of the folded portion 51. A basal portion 62, which extends in the outward direction of the vehicle, is provided on the distal end surface of the extended portion 61. A protrusion 63, which projects in the outward direction of the vehicle, is further provided on the central portion of the basal portion 62. The protrusion 63 contacts a facing portion 51a of the folded portion 51, which faces the protrusion 63 in the temporarily coupled state.

Figure 8C:
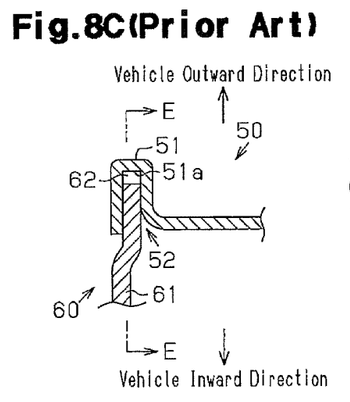
FIG. 8C is a cross-sectional view illustrating the surroundings of the folded portion in the state after the joint.
Figure 8D:
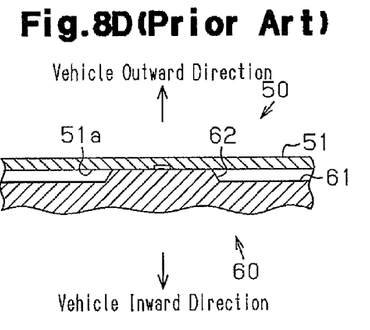
FIG. 8D is a cross-sectional view taken along line E-E.

In the temporarily coupled state, the folded portion 51 of the outer member 50 and the extended portion 61 of the inner member 60 are tightly held and pressurized between two welding electrodes of a resistance welding device. When a welding electric current flows between the electrodes, as shown in FIGS. 8C and 8D, the protrusion 63 is melted by heating by the concentration of the electric current so that the basal portion 62 and the facing portion 51a are pressurized and joined with each other. As a result, the outer member 50 and the inner member 60 are coupled with each other to be integrated.

PRIOR ART DOCUMENT

Patent Document

Patent Document 1: Japanese Laid-Open Patent Publication No. 2011-68181

SUMMARY OF THE INVENTION

Figure 9:
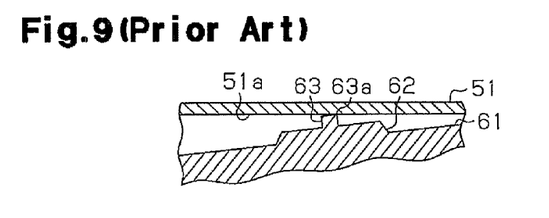
FIG. 9 is a cross-sectional view illustrating the situation in which a corner portion contacts the facing portion.

When the tip end of the protrusion 63, which serves for the resistance welding, includes a corner portion and the electric current concentrates on the corner portion, the phenomenon, which is referred to as spatter, may be caused in which the metal melted by welding disperses and is solidified to granulate. For example, as shown in FIG. 9, in the process where the folded portion 51 and the extended portion 61 are tightly held and pressurized between the welding electrodes, when the welding electric current flows in the state where the corner portion 63a of the protrusion 63 contacts the facing portion 51a, the electric current concentrates on the corner portion 63a, which may likely cause the spatter.

An objective of the present invention is to provide a vehicle door frame and an inner member for the vehicle door frame in which a stable welding is performed and stable quality is maintained after the welding.

To achieve the above described object, a vehicle door frame, which forms a window frame of a vehicle door, is provided. The door frame includes an outer member formed of a board and an elongated inner member formed of a board. The outer member forms a glass-run housing portion. The inner member includes a body portion for forming a framework of the window frame and is coupled to the outer member. The outer member includes an edge portion, which forms a part of the glass-run housing portion, and a folded portion provided at the edge portion. The folded portion includes a substantially U-shaped cross section including an opening, which opens in an inward direction of the vehicle. The inner member includes an extended portion, which extends in an outward direction of the vehicle from the body portion, and an edge portion provided at the extended portion. The edge portion of the extended portion is inserted into the opening of the folded portion. The edge portion of the extended portion includes a distal end surface. A protrusion is formed on the distal end surface. The protrusion protrudes in the outward direction of the vehicle and is located at a predetermined position of the inner member in the longitudinal direction. The folded portion has a facing portion that faces the distal end surface. The protrusion can be melted by heating by concentration of electric current during resistance welding and is configured to pressurize and join the distal end surface and the facing portion of the folded portion to each other. The protrusion includes a tip end, which has an arcuate cross section protruding in the outward direction of the vehicle.

In this structure, the protrusion, which serves for the resistance welding, includes a tip end shape without a corner portion. This limits occurrence of spatter. Accordingly, the protrusion is appropriately heated and melted by the concentration of the electric current during the resistance welding so that the distal end surface of the extended portion and the facing portion of the folded portion, which faces the distal end surface, are appropriately pressurized and joined. The stable quality is obtained after the joint. This allows the stable welding so that the stable quality is maintained after the joint.

According to a second aspect of the present invention, an inner member applied to a vehicle door frame forming a window frame of a vehicle door and configured to be coupled to an outer member is provided. The outer member is formed of a board and forms a glass-run housing portion. The outer member includes an edge portion, which forms a part of the glass-run housing portion, and a folded portion provided at the edge portion. The folded portion includes a substantially U-shaped cross section including an opening, which opens in an inward direction of the vehicle. The inner member is configured such that the inner member is formed of a board, includes a body portion, which forms a framework of the window frame, and is elongated. The inner member includes an extended portion, which extends in an outward direction of the vehicle from the body portion; and an edge portion provided at the extended portion. The edge portion of the extended portion is inserted into the opening of the folded portion. The edge portion of the extended portion includes a distal end surface. A protrusion is formed on the distal end surface. The protrusion protrudes in the outward direction of the vehicle, and is located at a predetermined position of the inner member in the longitudinal direction. The folded portion has a facing portion that faces the distal end surface. The protrusion can be melted by heating by concentration of electric current during resistance welding, and is configured to pressurize and join the distal end surface and the facing portion of the folded portion to each other. The protrusion includes a tip end, which has an arcuate cross section protruding in the outward direction of the vehicle.

DETAILED DESCRIPTION OF THE PREFERRED EMBODIMENTS

Hereinafter, a vehicle door frame according to an embodiment of the present invention will be described.

Figure 1:
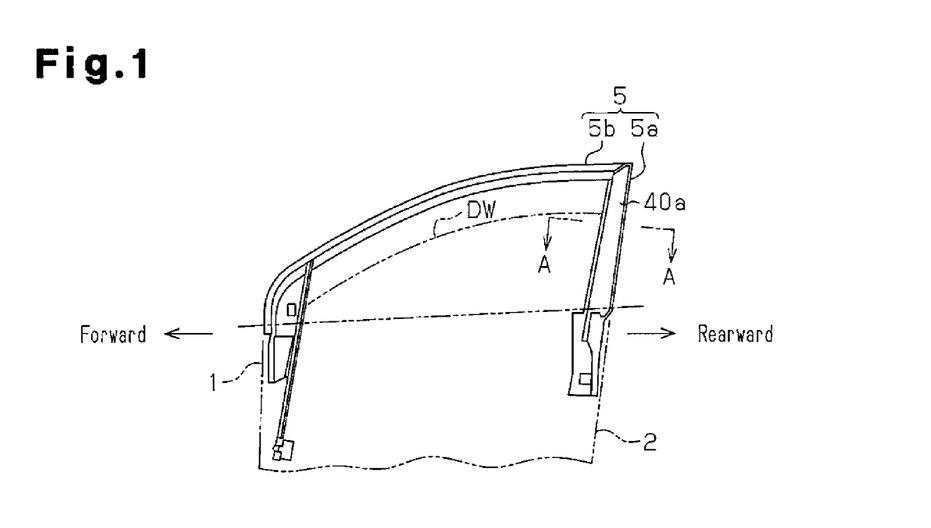
FIG. 1 is a side view from outside of a vehicle, illustrating an upper structure of a vehicle door to which a vehicle door frame according to an embodiment of the present invention is applied.

As shown in FIG. 1, a vehicle door 1 supported on the side of a vehicle body includes a door body 2, which configures a lower portion of the vehicle door 1. The door body 2 is a bag-like structure configured by coupling a door outer panel and a door inner panel (not shown). A door window glass DW, which appears and retracts through an upward opening, is provided in the door body 2.

The vehicle door 1 includes a door frame 5, which is attached to an upper end portion of the door body 2 and configures a window frame of the vehicle door 1, i.e., the frame of the door window glass DW. The door frame 5 includes a post 5a and a substantially arcuate upper rim 5b. The post 5a is fixed to, for example, the door inner panel of the door body 2 in the rear portion in the longitudinal direction of the vehicle and extends in the height direction of the vehicle. The upper rim 5b is fixed to the door body 2 in the front portion of the vehicle in the longitudinal direction and connected to the upper end of the post 5a. The door frame 5 opens downward. The vehicle door 1 of the present embodiment is a front door, which is arranged such that the upper rim 5b and the post 5a of the door frame 5 correspond to an A pillar and a B pillar of the vehicle body.

Figure 2:
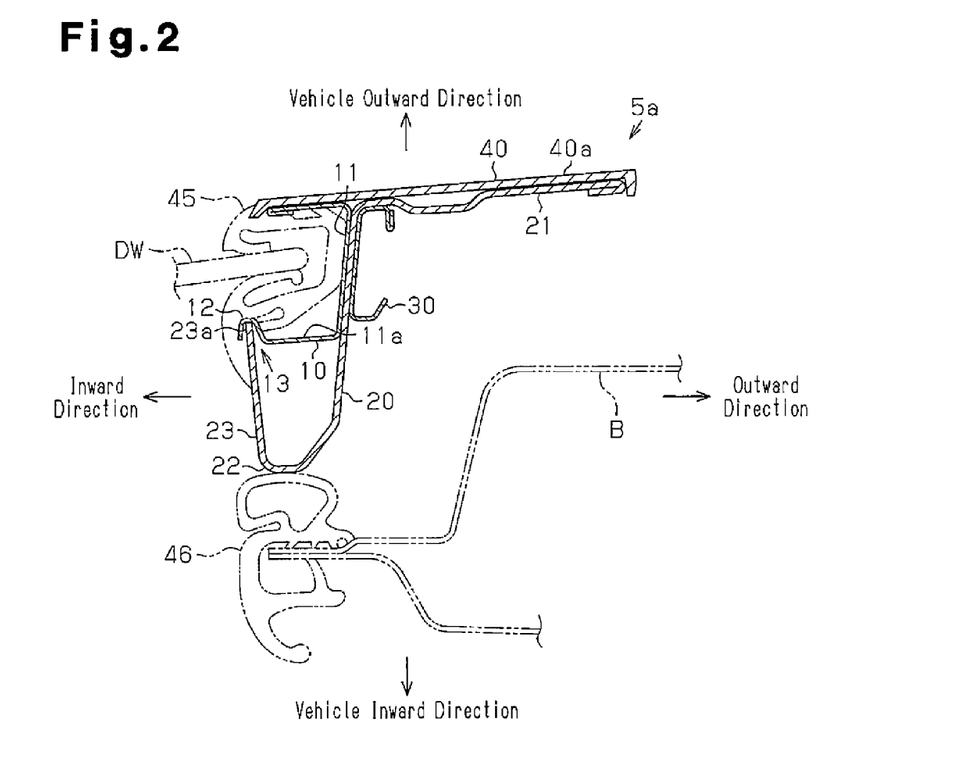
FIG. 2 is a cross-sectional view taken along line A-A in FIG. 1.

As shown in FIG. 2, the post 5a includes an outer member 10 formed by press-molding a board such as a steel plate, an inner member 20 formed by press-molding the same board, a sealing member housing portion 30 with a substantially C-shaped cross section, and an ornamental member 40 arranged outward of the vehicle. The ornamental member 40 extends from the portion in the outward direction, i.e., from the rear portion of the vehicle door 1 toward the portion in the inward direction facing the door window glass DW, i.e., toward the front portion of the vehicle door 1. Here, the phrase in the inward direction refers to the direction from the post 5a toward the central portion of the door frame 5. The phrase in the outward direction refers to the direction from the post 5a toward the rear portion. The plate thickness of the inner member 20 is set greater than the plate thickness of the outer member 10. The end surface of the ornamental member 40 exposed outward of the vehicle forms an ornamental surface 40a of the post 5a. The width of the ornamental surface 40a gradually changes according to the height direction of the vehicle. This improves the ornamental property of the ornamental surface 40a.

Figure 3:
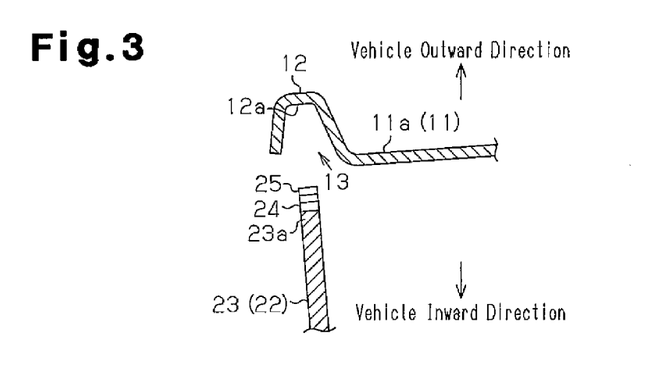
FIG. 3 is an exploded cross-sectional view illustrating an outer member and an inner member, in which surroundings of a folded portion of the outer member are enlarged.

The outer member 10 includes a glass-run housing portion 11 with a substantially U-shaped cross section, which opens in the inward direction of the vehicle door 1. The glass-run housing portion 11 includes a side wall portion 11a. The side wall portion 11a, in the inward direction in the lateral direction of the vehicle, i.e., in the inward direction of the vehicle, extends from the portion in the outward direction of the vehicle door 1 to the portion in the inward direction of the vehicle door 1. A folded portion 12, which is bent in the outward direction of the vehicle and then folded in the inward direction of the vehicle, is formed on the edge portion of the side wall portion 11a. As shown in FIG. 3, the folded portion 12 includes an opening 13, opens in the inward direction of the vehicle.

The inner member 20 is elongated extending in the vertical direction. The inner member 20 includes an attaching portion 21 and a body portion 22 with a substantially rectangular cross section. The attaching portion 21 and the body portion 22 are integrally formed with each other. The attaching portion 21 extends from the portion in the outward direction of the vehicle door 1 to the portion in the inward direction of the vehicle door 1 along the outer portion of the glass-run housing portion 11 and the inner portion of the ornamental member 40. The body portion 22 is continuous with the inner end of the attaching portion 21, bent in the inward direction of the vehicle and then folded in the outward direction of the vehicle to face the opening 13 of the folded portion 12. The body portion 22 forms the framework of the post 5a and includes an extended portion 23, which extends from the portion in the inward direction of the vehicle to the portion in the outward direction of the vehicle in the inward direction of the vehicle door 1. The inner member 20 is temporarily coupled to the outer member 10 such that the intermediate portion of the inner member 20 is located between the outer member 10 and the sealing member housing portion 30 and the edge portion 23a of the extended portion 23 is inserted into the opening 13 of the folded portion 12.

Next, a manner in which the outer member 10 and the inner member 20 are joined to each other will be described.

Figure 4:
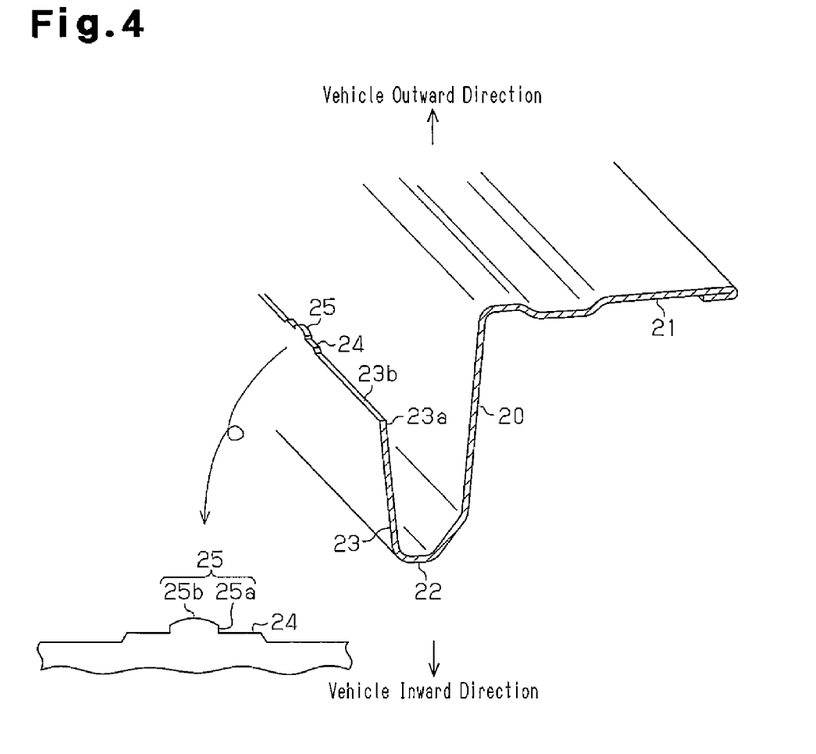
FIG. 4 is a perspective cross-sectional view of the inner member, and an enlarged front view of a protrusion.

As shown in FIG. 4, a plurality of basal portions 24, which trapezoidally protrudes in the outward direction of the vehicle, is provided on the distal end surface 23b of the edge portion 23a of the extended portion 23 in the longitudinal direction of the inner member 20. A protrusion 25, which protrudes in the outward direction of the vehicle, is further formed in the central portion of each basal portion 24 in the longitudinal direction. The protrusion 25 includes a tip end with a substantially arcuate cross section, which protrudes in the outward direction of the vehicle. That is, the tip end forms a curved surface. The distal end surface of the protrusion 25 is configured by a group of a plurality of profiles with substantially arcuate cross sections. That is, a tip end portion 25b of the protrusion 25 is formed by cutting a sphere in a certain first plane to obtain a three-dimensional shape and further cutting the obtained three-dimensional shape in two, second and third planes, which are parallel to each other and perpendicular to the first plane. Accordingly, the distal end surface of the protrusion 25 formed by the three-dimensional shape forms a part of the surface of the sphere. In the protrusion 25, a straight portion 25a, which maintains the maximum width of the above substantially arcuate tip end portion 25b, is formed in the portion of the root of the protrusion 25, which is continuous with the tip end with a substantially arcuate cross section. That is, the above tip end portion 25b with the three-dimensional shape is provided on the substantially square pole-shaped straight portion 25a as a base.

Figure 5A:
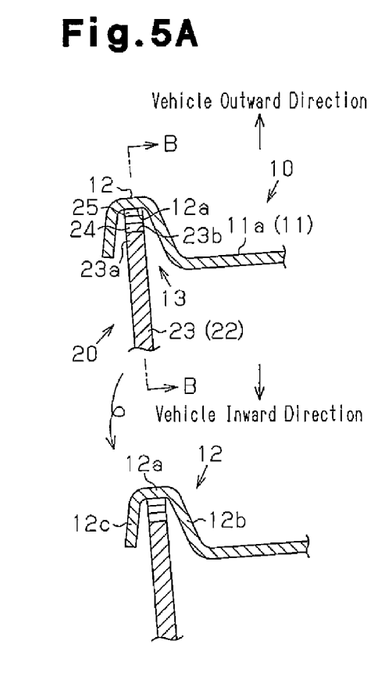
FIG. 5A is a cross-sectional view of the joint forms of the outer member and the inner member, illustrating the surroundings of the folded portion in the temporarily coupled state prior to the joint.
Figure 5B:
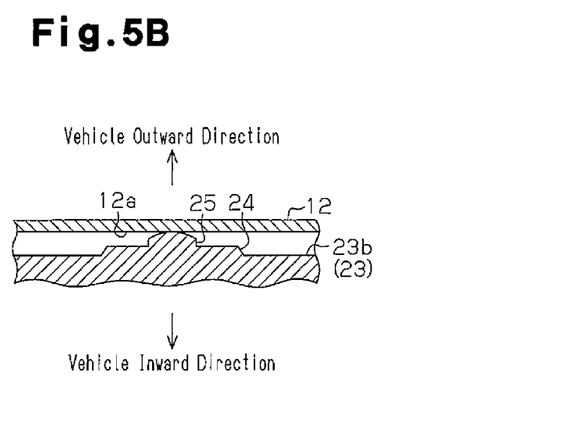
FIG. 5B is a cross-sectional view taken along line B-B.

As shown in FIG. 5A, the folded portion 12 includes a first bent portion 12b and a second bent portion 12c with a facing portion 12a, which contacts the protrusion 25 and is located between the first and second bent portions 12b and 12c. The first bent portion 12b is bent in the outward direction of the vehicle to be continuous with the facing portion 12a. The second bent portion 12c is folded in the inward direction of the vehicle from the facing portion 12a. The folded portion 12 includes a substantially inverted-U-shaped cross section, which opens wider in the inward direction of the vehicle. That is, each of the first bent portion 12b and the second bent portion 12c is separated from the extended portion 23. Both of the inner surfaces of the first bent portion 12b and the second bent portion 12c form inclined surfaces in which the distance from the first bent portion 12b toward the extended portion 23 and the distance from the second bent portion 12c toward the extended portion 23 are linearly increased in the inward direction of the vehicle from the facing portion 12a as a starting point. With the facing portion 12a as a starting point, both the inner surface of the first bent portion 12b and the inner surface of the second bent portion 12c are gradually separated from the extended portion 23 in the inward direction of the vehicle. As shown in FIG. 5B, in the temporarily coupled state, the gap is defined between the facing portion 12a and each basal portion 24 in the lateral direction of the vehicle.

Figure 5C:
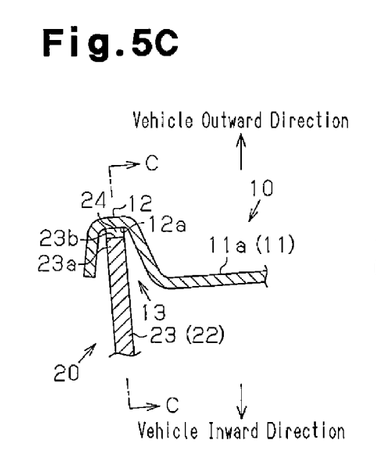
FIG. 5C is a cross-sectional view illustrating the surroundings of the folded portion in the state after the joint.
Figure 5D:
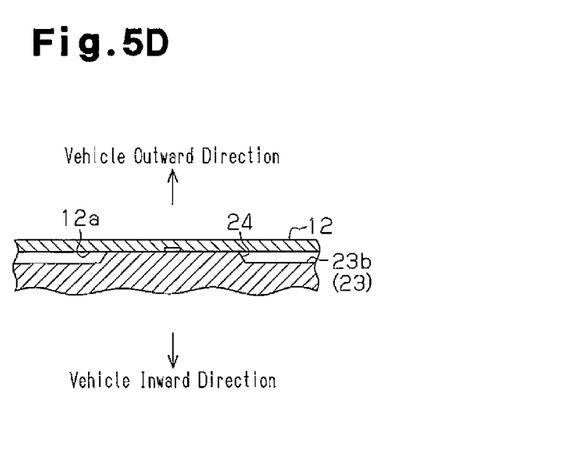
FIG. 5D is a cross-sectional view taken along line C-C.

In the temporarily coupled state, the folded portion 12 and the extended portion 23 are tightly held and pressurized between two welding electrodes of a resistance welding device (not shown), and a welding current flows between the electrodes. Then, as shown in FIGS. 5C and 5D, the protrusion 25 is melted by heating by the concentration of the current so that the basal portion 24 and the facing portion 12a are pressurized and joined with each other. After the joint, the gap between the facing portion 12a and the basal portion 24 is filled with the metal from the protrusion 25 so that the facing portion 12a and the basal portion 24 contact. As a result, the outer member 10 and the inner member 20 are coupled with each other to be integrated. The basal portion 24 is used as a positioning reference when coupling the members 10 and 20.

As shown in FIG. 2, a glass-run 45 with a substantially C-shaped cross section formed by, e.g., a rubber material is fluid-tightly provided along the entire length of the glass-run housing portion 11 in the longitudinal direction. The glass-run 45 is provided such that it protrudes greater than the opening end of the glass-run housing portion 11 with a substantially U-shaped cross section to limit the infiltration of water into the glass-run housing portion 11. In particular, the end portion of the glass-run 45 on the side in the inward direction of the vehicle is located in the more inward direction of the vehicle than the folded portion 12 of the outer member 10 and the edge portion 23a of the extended portion 23 of the inner member 20. This limits the infiltration of water into the inner space of the post 5a. Both of the circumferential edges of the door window glass DW on the side in the outward direction of the vehicle and the side in the inward direction of the vehicle can elastically contact the glass-run 45. Accordingly, the glass-run 45 elastically holds the door window glass DW such that the door window glass DW can be opened and closed.

A body sealing member 46, which fluid-tightly contacts the body portion 22 along the substantially entire length of the inner member 20 in the longitudinal direction, is held by an opening circumferential edge portion B of the vehicle body facing the post 5a of the vehicle door 1. Therefore, the post 5a and the opening circumferential edge portion B are fluid-tightly separated by the body sealing member 46 with the space between the post 5a in the outward direction of the vehicle and the opening circumferential edge portion B in the inward direction of the vehicle.

Further, a door sealing member that is not shown is held in the sealing member housing portion 30. The door sealing member fluid-tightly contacts the opening circumferential edge portion B of the vehicle body along the substantially entire length of the inner member 20 in the longitudinal direction.

Next, operation of the door frame 5 will be described.

In the temporarily coupling process, the extended portion 23 of the inner member 20 is inserted into the opening 13 of the folded portion 12 of the outer member 10 such that the extended portion 23 is tightly held and pressurized in the folded portion 12. At this time, the extended portion 23 is displaced along the inner surface of the first bent portion 12b or the inner surface of the second bent portion 12c so that the extended portion 23 is guided to a position in which the tip end of the protrusion 25 contacts the facing portion 12a. In the contacting state, the gap is defined between the extended portion 23 and the first bent portion 12b and between the extended portion 23 and the second bent portion 12c. If the welding current flows in the contacting state while maintaining the pressurizing and tightly holding of the extended portion 23 in the folded portion 12, the tip end portion 25b, which is round and includes no corner portion, of the protrusion 25 is melted by heating by the concentration of the electric current at the contacting portion. The tip end portion 25b is gradually heated so that the melting gradually proceeds at the beginning of the welding. At this time, the branch current of the welding current toward portions other than the protrusion 25 is avoided. Then, in the stage in which the welding is stable, the straight portion 25a is melted by heating. At this time, a sufficient amount of the melt for fixation is ensured. If the supply of the welding current is suspended while continuing the tightly holding and pressurizing of the extended portion 23 in the folded portion, the metal configuring the protrusion 25 is cooled and solidified so that the facing portion 12a and the basal portion 24 are pressurized and joined with each other. As a result, the outer member 10 and the inner member 20 are coupled with each other to be integrated.

As described above, the present embodiment has the following advantages.

(1) The protrusion 25, which serves for the resistance welding includes a tip end shape without a corner portion. This limits the occurrence of spatter. Accordingly, the protrusion 25 is appropriately melted by heating by the concentration of the electric current during the resistance welding. This appropriately pressurizes and joins the basal portion 24 provided on the distal end surface 23b of the extended portion 23 with the facing portion 12a of the folded portion 12. The stable quality is obtained after the joint. This allows the stable welding so that the stable quality is maintained after the joint.

(2) The tip end portion 25b of the protrusion 25 is melted by heating by the concentration of the electric current during the resistance welding, and then the straight portion 25a is melted by heating. Accordingly, the tip end portion 25b is melted by heating in the manner in which the spatter does not occur at the beginning of the melting, and then, in the stage in which the melting is stable, the straight portion 25a is melted by heating. At this time, a sufficient amount of the melt for fixation is ensured. This increases the degree of joint to increase the tensile strength.

(3) Each of the first bent portion 12b and the second bent portion 12c is arranged separate from the extended portion 23. Accordingly, the gap is defined between the extended portion 23 and the first bent portion 12b and between the extended portion 23 and the second bent portion 12c. Accordingly, the welding current concentrates on the target protrusion 25. That is, the branch current toward portions other than the target protrusion 25, i.e., toward the extended portion 23 is prevented. Therefore, the welding is performed with high efficiency.

(4) The extended portion 23 is inserted into the opening 13 of the folded portion 12 such that the extended portion 23 is tightly held and pressurized in the folded portion 12. At this time, the extended portion 23 is displaced along the inclined surface formed by the inner surface of the first bent portion 12b or the inner surface of the second bent portion 12c so that the extended portion 23 is guided to a position at which the tip end of the protrusion 25 contacts the facing portion 12a. This corrects positional shifting so that the welding is performed at a target position.

(5) The distal end surface of the protrusion 25 forms a curved surface as a part of a spherical surface. Accordingly, when any portion of the protrusion 25 comes into point contact or planar contact with the facing portion 12a, the portion is more gradually heated so that the melting more gradually proceeds than in the case where the electric current concentrates on the corner portion. Therefore, the occurrence of the spatter is limited so that the stable welding is performed.

The embodiment shown above may be modified as follows.

Regarding the protrusion 25, when forming the cross section of the tip end to be arcuate to protrude in the outward direction of the vehicle, the shape of the tip end may be formed to be an arc as a part of an ellipse or a parabola.

As for the protrusion 25, the straight portion 25a need not be provided on condition that the amount of the melt for fixation is ensured. For example, a semi-spherical protrusion 25 including an arcuate cross section with the greater height of the protrusion from the basal portion 24 may be formed. The basal portion 24 need not be provided. That is, the basal portion 24 may be omitted on condition that another configuration, which serves as a reference for positioning when the members are coupled, is provided, for example. In this case, the protrusion 25 is directly formed from the distal end surface 23b. As for the protrusion 25, the protrusion 25 in which the straight portion 25a is formed as well as a round tip end portion 25b, or the protrusion 25 in which only the round tip end portion 25b is formed are permitted.

The protrusion 25 may include a shape obtained by cutting a column in a plane including an axis of the column, for example. In this case, a part of the circumferential surface of the column is arcuate and the protrusion 25 extends with a constant cross section.

Figure 6A:
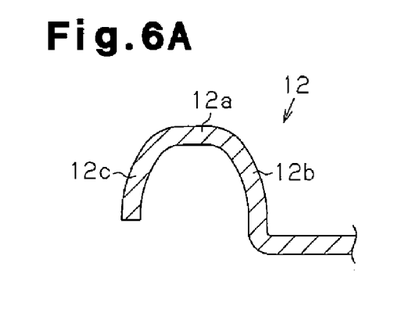
FIGS. 6A to 6D are enlarged cross-sectional views illustrating folded portions of door frames according to other embodiments.
Figure 6B:
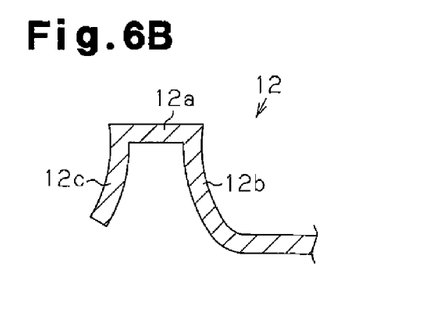
Figure 6C:
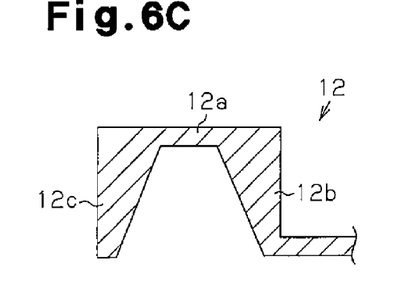
Figure 6D:
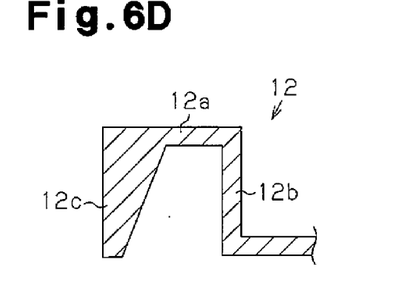

The inclined surface formed by the inner surface of the first bent portion 12b and the inner surface of the second bent portion 12c is not limited to the configuration in which the distance from the first bent portion 12b toward the extended portion 23 and the distance from the second bent portion 12c toward the extended portion 23 are linearly increased from the facing portion 12a as a starting point in the inward direction of the vehicle. For example, as shown in FIGS. 6A and 6B, the configuration in which the distance from the first bent portion 12b toward the extended portion 23 and the distance from the second bent portion 12c toward the extended portion 23 are curvilinearly increased from the facing portion 12a as a starting point in the inward direction of the vehicle may be adopted. Further, as shown in FIG. 6C, a configuration may be adopted in which an inclined surface is provided such that the distance from the first bent portion 12b toward the extended portion 23 and the distance from the second bent portion 12c toward the extended portion are linearly increased from the facing portion 12a as a starting point in the inward direction of the vehicle and the plate thickness of the inclined surface is reduced from the facing portion 12a as a starting point in the inward direction of the vehicle. Moreover, the combination of the configuration in FIGS. 6A and 6B and the configuration in FIG. 6C may configure the first bent portion 12b and the second bent portion 12c. As shown in FIG. 6D, a configuration may be adopted in which the inclined surface is formed by one of the inner surface of the first bent portion 12b and the inner surface of the second bent portion 12c.

Figure 7:
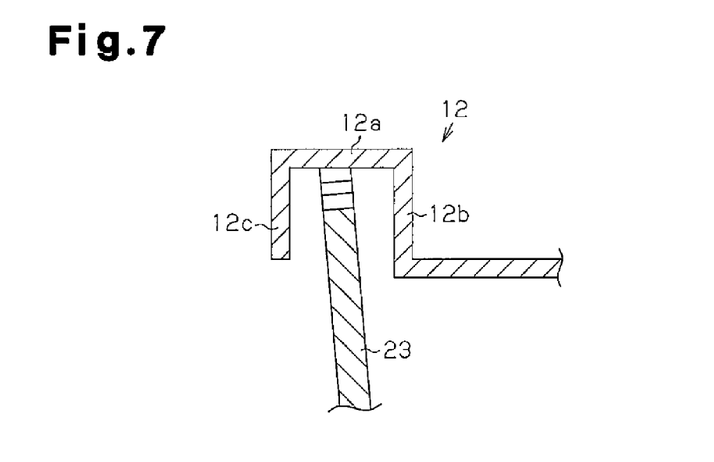
FIG. 7 is an enlarged cross-sectional view illustrating surroundings of the folded portion regarding the door frame according to another embodiment.

In the configuration in which the gap is defined between the extended portion 23 and the first bent portion 12b and between the extended portion 23 and the second bent portion 12c as shown in FIG. 7, a configuration may be adopted in which the inclined surface is not formed on the inner surface of the first bent portion 12b and the inner surface of the second bent portion 12c and the cross section of the folded portion 12 is angulated-inverted-U-shaped, which opens downward. Such a configuration also avoids the branch current of the welding current produced by defining the gap.

The ornamental member 40 may be omitted by adopting the outer member 10 formed integrally with the ornamental portion. In this case, the outer member 10 also serves as an ornamental portion. That is, a part of the outer member 10 is exposed outward of the vehicle. Accordingly, anti-corrosion steel sheet may be used for the outer member 10, for example.

Although the vehicle door frame according to the present invention is applied to the post 5a of the door frame 5 of the front door in the above embodiment, it may be applied to the upper rim 5b of the door frame 5 or a door frame, which forms a window frame of the rear door.

The invention claimed is:

1. A vehicle door frame, which forms a window frame of a door of a vehicle, the door frame comprising:
   an outer member formed of a board, wherein the outer member forms a glass-run housing portion;

an elongated inner member formed of a board, wherein the inner member includes a body portion for forming a framework of the window frame and is coupled to the outer member, wherein the outer member includes an edge portion, which forms a part of the glass-run housing portion, and a folded portion provided at the edge portion, the folded portion includes a substantially U-shaped cross section including an opening, which opens in an inward direction of the vehicle, the inner member includes an extended portion, which extends in an outward direction of the vehicle from the body portion, and an edge portion provided at the extended portion, the edge portion of the extended portion is inserted into the opening of the folded portion, the edge portion of the extended portion includes a distal end surface, a protrusion is formed on the distal end surface, wherein the protrusion protrudes in the outward direction of the vehicle and is located at a predetermined position of the inner member in the longitudinal direction, the folded portion has a facing portion that faces the distal end surface, the protrusion is configured to be melted by heating by concentration of electric current during resistance welding and is configured to pressurize and join the distal end surface and the facing portion of the folded portion to each other, the protrusion includes a tip end, which has an arcuate cross section protruding in the outward direction of the vehicle, the folded portion includes a first bent portion and a second bent portion, the first and second bent portions being arranged on respective sides of the facing portion, the protrusion contacting the facing portion, the first bent portion is folded in the outward direction of the vehicle and is continuous with the facing portion, the second bent portion is folded in the inward direction of the vehicle from the facing portion, and the first bent portion and the second bent portion are separated from the extended portion.

2. The vehicle door frame according to claim 1, wherein the protrusion includes, at a root continuous with the tip end with the arcuate cross section, a straight portion with a width that is equal to a maximum width of the tip end.

3. The vehicle door frame according to claim 1, wherein at least one of an inner surface of the first bent portion and an inner surface of the second bent portion is, with the facing portion as a starting point, gradually separated away from the extended portion in the inward direction of the vehicle.

4. The vehicle door frame according to claim 1, wherein the tip end of the protrusion is formed by a group of a plurality of profiles with arcuate cross sections.

5. An inner member adapted to a vehicle door frame forming a window frame of a door of a vehicle and configured to be coupled to an outer member, which is formed of a board and forms a glass-run housing portion, wherein:

the outer member includes an edge portion, which forms a part of the glass-run housing portion, and a folded portion provided at the edge portion, the folded portion includes a substantially U-shaped cross section including an opening, which opens in an inward direction of the vehicle, the inner member is configured such that the inner member is formed of a board, includes a body portion, which forms a framework of the window frame, and is elongated, the inner member includes an extended portion, which extends in an outward direction of the vehicle from the body portion, and an edge portion provided at the extended portion, the edge portion of the extended portion is inserted into the opening of the folded portion, the edge portion of the extended portion includes a distal end surface, a protrusion is formed on the distal end surface, wherein the protrusion protrudes in the outward direction of the vehicle, and is located at a predetermined position of the inner member in the longitudinal direction, the folded portion has a facing portion that faces the distal end surface, the protrusion is configured to be melted by heating by concentration of electric current during resistance welding, and is configured to pressurize and join the distal end surface and the facing portion of the folded portion to each other, the protrusion includes a tip end, which has an arcuate cross section protruding in the outward direction of the vehicle, the folded portion includes a first bent portion and a second bent portion, the first and second bent portions being arranged on respective sides of the facing portion, the protrusion contacting the facing portion, the first bent portion is folded in the outward direction of the vehicle and is continuous with the facing portion, the second bent portion is folded in the inward direction of the vehicle from the facing portion, and the first bent portion and the second bent portion are arranged separated from the extended portion.

* * * * *